(12) United States Patent
Zhao et al.

(10) Patent No.: US 10,285,194 B2
(45) Date of Patent: May 7, 2019

(54) D2D COMMUNICATION METHOD AND DEVICE

(71) Applicant: China Academy of Telecommunications Technology, Beijing (CN)

(72) Inventors: Rui Zhao, Beijing (CN); Qiubin Gao, Beijing (CN); Wenhong Chen, Beijing (CN); Ying Peng, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 48 days.

(21) Appl. No.: 15/309,646

(22) PCT Filed: May 7, 2015

(86) PCT No.: PCT/CN2015/078462
§ 371 (c)(1),
(2) Date: Nov. 8, 2016

(87) PCT Pub. No.: WO2015/169239
PCT Pub. Date: Nov. 12, 2015

(65) Prior Publication Data
US 2017/0223729 A1      Aug. 3, 2017

(30) Foreign Application Priority Data

May 9, 2014   (CN) ............................. 201410196036

(51) Int. Cl.
*H04W 74/00* (2009.01)
*H04W 74/08* (2009.01)
(Continued)

(52) U.S. Cl.
CPC ..... *H04W 74/002* (2013.01); *H04W 74/0816* (2013.01); *H04W 76/14* (2018.02); *H04W 84/042* (2013.01)

(58) Field of Classification Search
CPC .............. H04W 74/002; H04W 76/14; H04W 74/0816; H04W 76/023; H04W 84/042;
(Continued)

(56) References Cited

U.S. PATENT DOCUMENTS

2012/0281679 A1   11/2012   Fan et al.
2013/0028224 A1   1/2013   Chen et al.
(Continued)

FOREIGN PATENT DOCUMENTS

CN       101548570 A     9/2009
CN       102111887 A     6/2011
(Continued)

OTHER PUBLICATIONS

International Search Report for PCT/CN2015/078462 dated Jul. 17, 2015.

*Primary Examiner* — Eric Myers
(74) *Attorney, Agent, or Firm* — Foley & Lardner LLP (57) ABSTRACT

Disclosed are a D2D communication method and device. The method comprises: sending a preamble on a sub-channel set of a competition region, and monitoring the preamble on the sub-channel set of the competition region; and if the preamble is not monitored on the sub-channel set of the competition region, sending data on a sub-channel set of a data region corresponding to the sub-channel set of the competition region, different sub-channel sets of the competition region corresponding to different sub-channel sets of the data region. The technical solution provided in the embodiments of the present invention can effectively avoid the resource conflict of a D2D UE. In addition, since a
(Continued)

preamble occupies fewer resources, competing for sub-channel resources of a data region by sending a preamble could effectively reduce the overhead of resource competition.

14 Claims, 4 Drawing Sheets

(51) Int. Cl.
    *H04W 76/14*      (2018.01)
    *H04W 84/04*      (2009.01)

(58) Field of Classification Search
    CPC .... H04W 4/70–4/90; H04W 28/021–28/0215; H04W 72/1278; H04W 72/14; H04W 84/18
    See application file for complete search history.

(56) References Cited

U.S. PATENT DOCUMENTS

| | | |
|---|---|---|
| 2013/0157670 A1 | 6/2013 | Koskela et al. |
| 2013/0195081 A1* | 8/2013 | Merlin ............... H04W 74/002 |
| | | 370/336 |
| 2014/0086200 A1 | 3/2014 | Seok |
| 2016/0057743 A1* | 2/2016 | Aiba .................... H04W 72/04 |
| | | 370/329 |

FOREIGN PATENT DOCUMENTS

| | | |
|---|---|---|
| CN | 102550117 | 7/2012 |
| CN | 102835176 | 12/2012 |
| CN | 103748947 | 4/2014 |
| WO | WO-2013/031351 A1 | 3/2013 |

* cited by examiner

D2D COMMUNICATION METHOD AND DEVICE

CROSS-REFERENCE TO RELATED APPLICATIONS

This application is a National Stage of International Application No. PCT/CN2015/078462, filed on May 7, 2015, which claims priority to Chinese Patent Application No. 201410196036.1, filed on May 9, 2014, both of which are hereby incorporated by reference in their entireties.

FIELD

The present invention relates to the field of wireless communications, and particularly to a D2D communication method and device.

BACKGROUND

Device to Device (D2D) communication, i.e., direction communication between devices, refers to a mode in which adjacent User Equipments (UEs) can transmit data over a direct link in a short-distance range without the data being forwarded by a central node (i.e., an eNB).

There are generally the following four scenarios in the studies on D2D communication, where more than one of the scenarios can occur concurrently:

An out of coverage scenario where both a UE 1 and a UE 2 reside outside a coverage area;

A partial coverage scenario where the UE 1 resides in the coverage area of a cell (in coverage), and the UE 2 resides outside the coverage area of the cell;

An in coverage-single-cell scenario where the UE 1 and the UE 2 reside in the coverage area of the same cell; and An in coverage-multi-cell scenario where the UE 1 and the UE 2 reside in the coverage areas of different cells.

Particularly if the UE 1 is a transmitting UE transmitting information, then the UE 2 will receive the information transmitted by the UE 1. Alternatively the UE 2 can be a transmitting UE transmitting information, and the UE 1 can receive the information transmitted by the UE 2.

In D2D communication, in addition to the one-to-one communication mode between D2D UEs, there is another typical application scenario where group/broadcast communication is conducted between the D2D UEs, which can be applicable to fire fighting, rescue, antiterrorism, etc., among public security applications.

The Long Term Evolution (LTE) D2D technology refers to D2D discovery and communication procedures, controlled by an LTE network, operating in an LTE licensed frequency band. On one hand, the advantages of the D2D technology can be fully utilized, and on the other hand, some problems of the traditional D2D technology, e.g., uncontrollable interference, etc., can be overcome due to the control by the LTE network. The LTE D2D characteristics have been introduced to enable the LTE technology to evolve from the simple radio mobile cellular communication technology toward the universal connectivity technology.

In LTE D2D transmission, in a competition-based resource allocation method, the respective D2D UEs compete for resources for D2D transmission under the same rule. This method is generally applicable to such a scenario that there is no central scheduling node, e.g., the out of coverage scenario above, where the respective D2D UEs compete randomly for transmission resources without centralized scheduling, thus resulting in resource collision.

SUMMARY

An object of the invention is to provide a D2D communication method and user equipment so as to address the problem of resource collision arising from competition for resources in the existing D2D communication flow.

The object of the invention is attained by the following technical solutions:

A D2D communication method includes:

transmitting a preamble over a set of sub-channels in a competition area, and monitoring a preamble over the set of sub-channels in the competition area; and transmitting data over a set of sub-channels in a data area corresponding to the set of sub-channels in the competition area when there is no preamble monitored over the set of sub-channels in the competition area, wherein different set of sub-channels in the competition area correspond to different set of sub-channels in the data area.

With the technical solution according to the embodiment of the invention, a preamble is transmitted over a set of sub-channels in the competition area to compete for resources in a corresponding set of sub-channels in the data area, and a preamble is monitored to thereby determine whether there is another D2D UE competing for the same sub-channel resources in the data area. If no preamble is monitored, which indicates that the resources in the corresponding set of sub-channels in the data area are occupied as a result of competition, then data will be transmitted over the resources. As can be apparent, the technical solution according to the embodiments of the invention can avoid in effect resource collision between the D2D UEs. Furthermore since fewer resources are occupied by the preamble, an overhead of resource competition can be lowered in effect by transmitting the preamble to compete for the sub-channel resources in the data area.

Preferably before the data are transmitted over the set of sub-channels in the data area corresponding to the set of sub-channels in the competition area, the method further includes:

transmitting control information over all or a part of sub-channels in a set of sub-channels in a control area corresponding to the set of sub-channels in the competition area; and transmitting the data over the set of sub-channels in the data area corresponding to the set of sub-channels in the competition area includes:

transmitting the data over the set of sub-channels in the data area corresponding to the set of sub-channels in the competition area as instructed by the control information.

Preferably the control information includes a data transmission resource indicator and/or a modulation and coding scheme indicator.

Further to any one of the embodiments above of the method, preferably transmitting a preamble over the set of sub-channels in the competition area, and monitoring a preamble over the set of sub-channels in the competition area includes:

transmitting preambles on transmission occasions in an "ON" state over the set of sub-channels in the competition area, wherein the competition area includes a plurality of transmission occasions, each of the transmission occasions is in an "OFF" state or the "ON" state; and monitoring a preamble on transmission occasions in the "OFF" state over the set of sub-channels in the competition area.

Preferably when a preamble is monitored on the transmission occasions in the "OFF" state over the set of sub-channels in the competition area, stopping transmitting the preambles on subsequent transmission occasions in the "ON" state over the set of sub-channels in the competition area.

Preferably each of the transmission occasions includes a transmission component and a processing component, wherein the transmission component is configured to transmit a preamble; and the processing component is configured to process a monitored preamble, and perform a switch between transmitting and receiving.

Based upon the same inventive idea as the method, some embodiments of the invention further provide a user equipment including:

at least one process and a memory configured to store at least one computer program executed by the at least one processor:

wherein the at least one computer program is executed by the at least one processor to:

transmit a preamble over a set of sub-channels in a competition area, and monitor a preamble over the set of sub-channels in the competition area; and transmit data over a set of sub-channels in a data area corresponding to the set of sub-channels in the competition area when there is no preamble monitored over the set of sub-channels in the competition area, wherein different set of sub-channels in the competition area correspond to different set of sub-channels in the data area With the technical solution according to the embodiment of the invention, a preamble is transmitted over a set of sub-channels in the competition area to compete for resources in a corresponding set of sub-channels in the data area, and a preamble is monitored to thereby determine whether there is another D2D UE competing for the same sub-channel resources in the data area. If no preamble is monitored, which indicates that the resources in the corresponding set of sub-channels in the data area are occupied as a result of competition, then data will be transmitted over the resources. As can be apparent, the technical solution according to the embodiments of the invention can avoid in effect resource collision between the D2D UEs. Furthermore since fewer resources are occupied by the preamble, an overhead of resource competition can be lowered in effect by transmitting the preamble to compete for the sub-channel resources in the data area.

Preferably the at least one computer program is executed by the at least one processor to:

transmit control information over all or a part of sub-channels in a set of sub-channels in a control area corresponding to the set of sub-channels in the competition area; and transmit the data over the set of sub-channels in the data area corresponding to the set of sub-channels in the competition area as instructed by the control information.

Further to any one of the embodiments above of the user equipment, preferably the at least one computer program is executed by the at least one processor to:

transmit preambles on transmission occasions in an "ON" state over the set of sub-channels in the competition area, wherein the competition area includes a plurality of transmission occasions, each of which is in an "OFF" state or the "ON" state; and monitor a preamble on transmission occasions in the "OFF" state over the set of sub-channels in the competition area.

Preferably the at least one computer program is executed by the at least one processor to stop transmitting the preambles on subsequent transmission occasions in the "ON" state over the set of sub-channels in the competition area, when a preamble is monitored on the transmission occasions in the "OFF" state over the set of sub-channels in the competition area.

Preferably each of the transmission occasions includes a transmission component and a processing component, wherein the transmission component is configured to transmit a preamble; and the processing component is configured to process a monitored preamble, and perform a switch between transmitting and receiving.

Preferably the control information includes a data transmission resource indicator and/or a modulation and coding scheme indicator.

With the technical solution according to the embodiments of the invention, a preamble is transmitted over a set of sub-channels in the competition area to compete for resources in a corresponding set of sub-channels in the data area, and a preamble is monitored to thereby determine whether there is another D2D UE competing for the same sub-channel resources in the data area. If no preamble is monitored, which indicates that the resources in the corresponding set of sub-channels in the data area are occupied as a result of competition, then data will be transmitted over the resources. As can be apparent, the technical solution according to the embodiment of the invention can avoid in effect resource collision between the D2D UEs. Furthermore since fewer resources are occupied by the preamble, an overhead of resource competition can be lowered in effect by transmitting the preamble to compete for the sub-channel resources in the data area.

DETAILED DESCRIPTION OF THE EMBODIMENTS

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. Based upon the embodiments here of the invention, all the other embodiments which can occur to those skilled in the art without any inventive effort shall fall into the scope of the invention.

It shall be appreciated that the technical solutions according to the invention can be applicable to various communication systems, for example, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced-Long Term Evolution (LTE-A) system, a Universal Mobile Telecommunication System (UMTS), etc.

It shall be further appreciated that in the embodiments of the invention, a User Equipment (UE) includes but will not be limited to a Mobile Station (MS), a Mobile Terminal (MT), a Mobile Telephone (MT), a handset, a portable equipment, etc., and the user equipment can communicate with one or more core networks over a Radio Access Network (RAN), for example, the user equipment can be a mobile phone (or referred to as a "cellular" phone), a computer capable of wireless communication, etc., and the user equipment can also be a portable, pocket, handheld, built-in-computer, or vehicular mobile device.

The technical solutions according to the embodiments of the invention will be described below in details with reference to the drawings.

Figure 1:
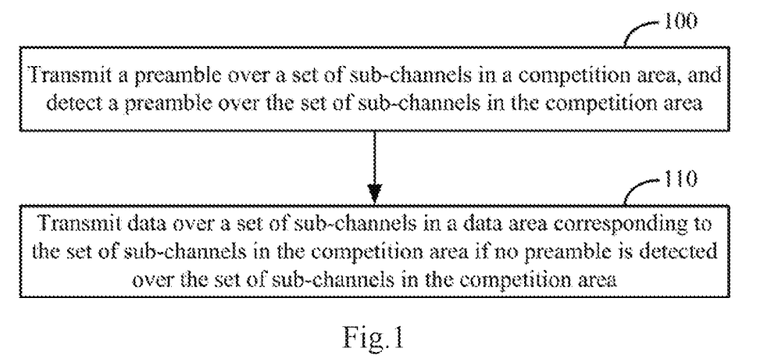
FIG. 1 is a flow chart of a method according to some embodiments of the invention.

FIG. 1 illustrates a D2D communication method according to some embodiments of the invention, where the method particularly includes the following steps:

The step 100 is to transmit a preamble over a set of sub-channels in a competition area, and to monitor a preamble over the set of sub-channels in the competition area.

Here the preamble to be monitored is a preamble transmitted by another D2D UE.

Here the preamble can be monitored by detecting energy, or the preamble can be monitored by detecting a correlated sequence.

The step 110 is to transmit data over a set of sub-channels in a data area corresponding to the set of sub-channels in the competition area if no preamble is monitored over the set of sub-channels in the competition area.

In some embodiments of the invention, the set of sub-channels includes at least one sub-channel.

In some embodiments of the invention, different set of sub-channels in the competition area correspond to different set of sub-channels in the data area. Preferably the sub-channels in the competition area correspond to the sub-channels in the data area in a one-to-one manner.

With the technical solution according to the embodiments of the invention, a preamble is transmitted over a set of sub-channels in the competition area to compete for resources in a corresponding set of sub-channels in the data area, and a preamble is monitored to thereby determine whether there is another D2D UE competing for the same sub-channel resources in the data area. If no preamble is monitored, which indicates that the resources in the corresponding set of sub-channels in the data area are occupied as a result of competition, then data will be transmitted over the resources. As can be apparent, the technical solution according to the embodiments of the invention can avoid in effect resource collision between the D2D UEs. Furthermore since fewer resources are occupied by the preamble, an overhead of resource competition can be lowered in effect by transmitting the preamble to compete for the sub-channel resources in the data area.

As described above, in the embodiments of the invention, D2D resources include the competition area and the data area, where a preamble is transmitted in the competition area to compete for the sub-channel resources in the data area, and data are transmitted in the data area. Preferably the competition area and the data area operate in the Time Division Multiplex (TDM) mode. Of course, the competition area and the data area can alternatively operate in the Frequency Division Multiplex (FDM) mode.

Figure 2:
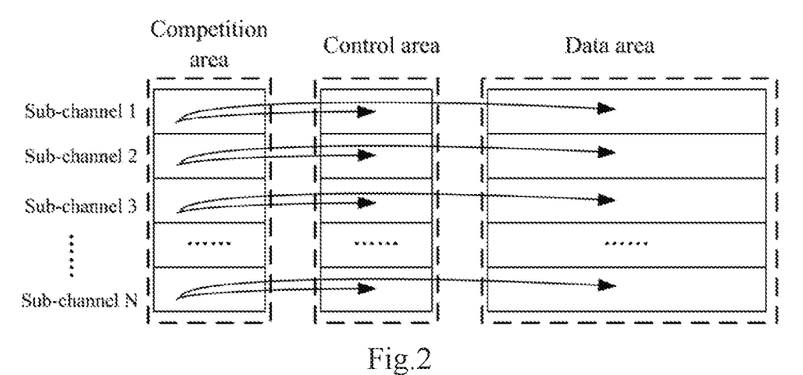
FIG. 2 is a schematic diagram of a sub-channel correspondence relationship according to some embodiments of the invention.

Furthermore D2D resources include a control area in which control information to instruct data to be transmitted is transmitted. The different sets of sub-channels in the competition area correspond to the different sets of sub-channels in the control area, that is, as illustrated in FIG. 2, the sub-channels in the competition area correspond to the sub-channels in the control area in a one-to-one manner. In FIG. 2, an arrow represents a correspondence relationship between the control area, the data area, and the competition area. It shall be noted that the correspondence relationship illustrated in FIG. 2 is merely an example but not limiting.

Preferably the control area operates with the competition area and the data area in the TDM mode. Of course, the control area can operate with the competition area and the data area in the FDM mode. Correspondingly after the set of sub-channels in the data area is occupied as a result of competition, firstly the control information is transmitted over all or a part of the sub-channels in the set of sub-channels in the control area corresponding to the set of sub-channels in the competition area, and then the data are transmitted over the set of sub-channels in the data area corresponding to the set of sub-channels in the competition area as instructed by the control information.

More preferably the control information includes a data transmission resource indicator and/or a modulation and coding scheme indicator.

Figure 3A:
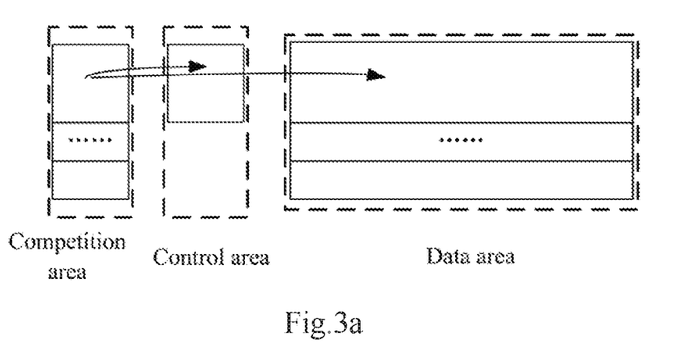
FIG. 3a is a schematic diagram of a sub-channel over which control information is transmitted according to some embodiments of the invention.
Figure 3B:
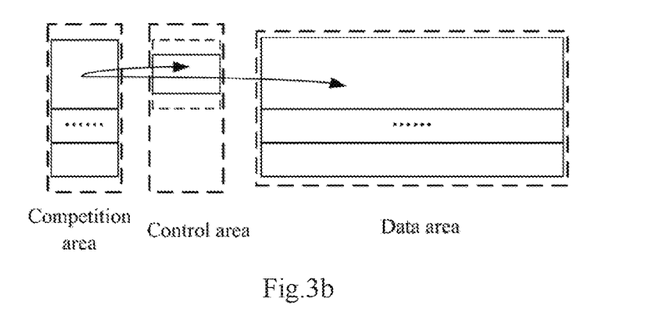
FIG. 3b is another schematic diagram of a sub-channel over which control information is transmitted according to some embodiments of the invention.

If the sub-channels in the data area need to be aggregated due to different service demands in data transmission, that is, data are transmitted over at least two sub-channels, then a preamble will be transmitted over each sub-channel in a set of sub-channels in the competition area corresponding to a set of sub-channels over which the data need to be transmitted in the data area. Control information can be transmitted over respective sub-channels in a set of sub-channels in the control area corresponding to the set of sub-channels in the competition area, over which the preambles are transmitted as illustrated in FIG. 3a; or control information can be transmitted over a part (subset) of sub-channels in a set of sub-channels in the control area corresponding to the set of sub-channels in the competition area, over which the preambles are transmitted as illustrated in FIG. 3b.

Further to any one of the embodiments above, preferably there are a number of transmit occasions in the competition area, where the state of a transmit occasion includes a silent (off) state and a transmission (on) state. Particularly the preambles are transmitted on transmission occasions in the "ON" state over the set of sub-channels in the competition area, and a preamble is monitored on transmission occasions in the "OFF" state over the set of sub-channels in the competition area. Here the states of the respective transmission occasions in the competition area are random for each D2D UE. For example, the D2D UE generates randomly an ON/OFF pattern indicating the states of the respective transmission occasions in the competition area.

Figure 4:
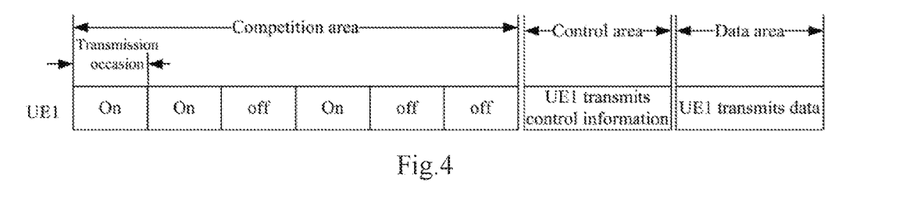
FIG. 4 is a schematic diagram of competition for resources according to some embodiments of the invention.

For example, a UE1 transmits a preamble on a transmission occasion in the "ON" state, and monitors a preamble on a transmission occasion in the "OFF" state, in a randomly generated ON/OFF pattern over a sub-channel in the competition area illustrated in FIG. 4. If the UE1 monitors no preamble over the sub-channel in the competition area, then the UE1 will transmit control information over a corresponding sub-channel in the control area, and transmit data over a corresponding sub-channel in the data area as indicated by the control information.

Furthermore if a preamble is monitored on some transmission occasion in the "OFF" state over the set of sub-channels in the competition area, then the preambles will be stopped from being transmitted on subsequent transmission occasions in the "ON" state over the set of sub-channels in the competition area.

Figure 5:
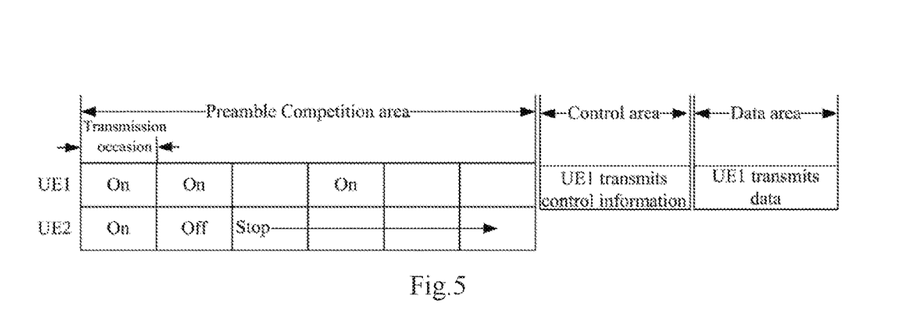
FIG. 5 is a schematic diagram of an ON/"OFF" state of a transmit occasion according to some embodiments of the invention.

For example, the UE1 and a UE2 transmit preambles over the same sub-channel in the competition area, and the UE1 and the UE2 randomly generate ON/OFF patterns respectively indicating states of respective transmission occasions over the sub-channel as illustrated in FIG. 5. If the UE2 monitors the preamble transmitted by the UE1 on the second transmit occasion, then the UE2 will stop preambles from being transmitted on subsequent transmission occasions (the $3^{rd}$ to $6^{th}$ transmission occasions) in the competition area, and the UE will occupy a corresponding sub-channel resource in the data area as a result of competition, transmit control information over a corresponding sub-channel in the control area, and transmit data over the corresponding sub-channel resource in the data area as indicated by the control information.

Figure 6:
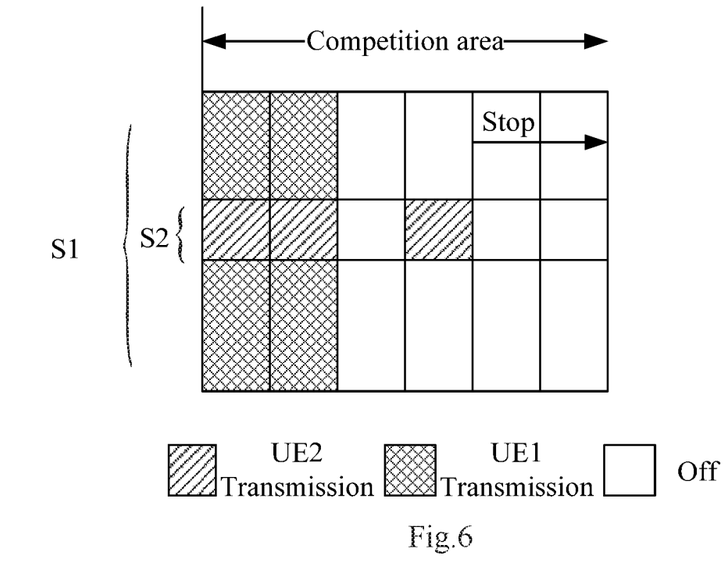
FIG. 6 is another schematic diagram of competition for resources according to some embodiments of the invention.

In some embodiments of the invention, preferably the D2D UE monitors a preamble only over respective sub-channels in a set of sub-channels over which preambles are transmitted in the competition area. For example, the UE1 and the UE2 compete for resources in different set of sub-channels, where the UE1 transmits a preamble over a set S1 of sub-channels in the control area (as illustrated in FIG. 6, equivalently the UE1 transmits a preamble over a control area corresponding set S1 of sub-channels in the competition area), and the UE1 transmits a preamble over a set S2 of sub-channels in the control area (as illustrated in FIG. 6, equivalently the UE2 transmits a preamble over a control area corresponding set S2 of sub-channels in the competition area); and as illustrated in FIG. 6, S2 is a subset of S1. Accordingly the UE1 monitors a preamble only over S1, and the UE2 monitors a preamble only over S2. If the UE1 monitors a preamble on the $4^{th}$ transmission occasion, then the UE1 will stop the preamble from being transmitted over S1.

Preferably a transmission occasion includes a transmission component and a processing component, where a preamble is transmitted in the transmission component, and the processing component is also referred to as a Guard Period (GP) in which a monitored preamble is processed. The processing component further includes a transmit-receive switching period of time for switching between transmitting and receiving, particularly between a transmitter and a receiver.

Here the preamble is processed particularly by detecting energy or a correlated sequence.

The transmission occasion includes the transmission component and the processing component so that the D2D UE competing for resources can determine whether a preamble is monitored in a preceding transmission occasion before a succeeding transmission occasion arrives.

Figure 7A:
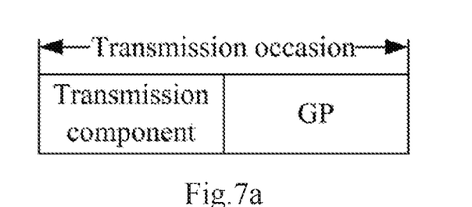
FIG. 7a is a schematic diagram of a transmit occasion according to some embodiments of the invention.
Figure 7B:
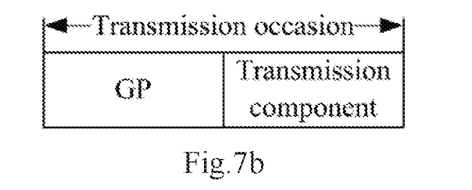
FIG. 7b is another schematic diagram of a transmit occasion according to some embodiments of the invention.
Figure 7C:
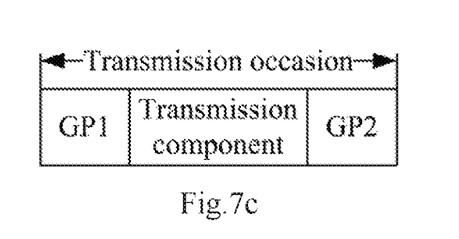
FIG. 7c is another schematic diagram of a transmit occasion according to some embodiments of the invention.

Preferably the transmission component and the processing component of the transmission occasion can operate in the TDM mode, where they can be positioned particularly as illustrated in FIG. 7a, FIG. 7b, and FIG. 7c.

In some embodiments of the invention, the granularity of the transmission occasions can be an Orthogonal Frequency Division Multiplexing (OFDM) symbol.

If the length of a preamble sequence is one OFDM symbol, where the length of the GP is one OFDM symbol, then the length of the transmission occasion will be two OFDM symbols. Accordingly the preamble sequence can be embodied similarly to a DMRS sequence over a Physical Uplink Shared Channel (PUSCH).

If the length of the preamble sequence is half an OFDM symbol, where the length of the GP is half an OFDM symbol, then the length of the transmission occasion will be one OFDM symbol. Accordingly the preamble sequence can be embodied similarly to an SRS, and fixed as an even number of sub-carriers or an odd number of sub-carriers.

Figure 8:
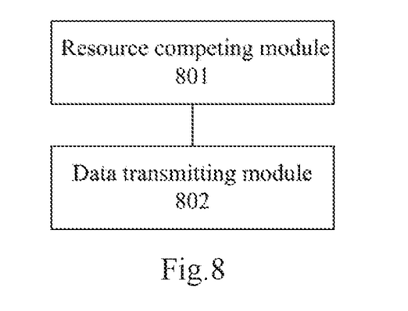
FIG. 8 is a schematic diagram of a user equipment according to some embodiments of the invention.

Based upon the same inventive idea as the method, some embodiments of the invention further provide a user equipment as illustrated in FIG. 8 including:

A resource competing module 801 is configured to transmit a preamble over a set of sub-channels in a competition area, and to monitor a preamble over the set of sub-channels in the competition area; and A data transmitting module 802 is configured to transmit data over a set of sub-channels in a data area corresponding to the set of sub-channels in the competition area if the resource competing module monitors no preamble over the set of sub-channels in the competition area, where different set of sub-channels in the competition area correspond to different set of sub-channels in the data area.

With the technical solution according to the embodiments of the invention, a preamble is transmitted over a set of sub-channels in the competition area to compete for resources in a corresponding set of sub-channels in the data area, and a preamble is monitored to thereby determine whether there is another D2D UE competing for the same sub-channel resources in the data area. If no preamble is monitored, which indicates that the resources in the corresponding set of sub-channels in the data area are occupied as a result of competition, then data will be transmitted over the resources. As can be apparent, the technical solution according to the embodiments of the invention can avoid in effect resource collision between the D2D UEs. Furthermore since fewer resources are occupied by the preamble, an overhead of resource competition can be lowered in effect by transmitting the preamble to compete for the sub-channel resources in the data area.

Preferably the apparatus further includes a control information transmitting module configured:

To transmit control information over all or a part of sub-channels in a set of sub-channels in a control area corresponding to the set of sub-channels in the competition area; and The data transmitting module is configured:

To transmit the data over the set of sub-channels in the data area corresponding to the set of sub-channels in the competition area as instructed by the control information.

Preferably the resource competing module is configured:

To transmit preambles on transmission occasions in an "ON" state over the set of sub-channels in the competition area including a number of transmission occasions, each of which is in an "OFF" state or the "ON" state; and To monitor a preamble on transmission occasions in the "OFF" state over the set of sub-channels in the competition area.

Preferably the resource competing module is further configured, if a preamble is monitored on some transmission occasion in the "OFF" state over the set of sub-channels in the competition area, to stop the preambles from being transmitted on subsequent transmission occasions in the "ON" state over the set of sub-channels in the competition area.

Preferably each of the transmission occasions includes a transmission component and a processing component, where a preamble is transmitted in the transmission component; and a monitored preamble is processed, and switching between transmitting and receiving is performed, in the processing component.

Preferably the control information includes a data transmission resource indicator and/or a modulation and coding scheme indicator.

Figure 9:
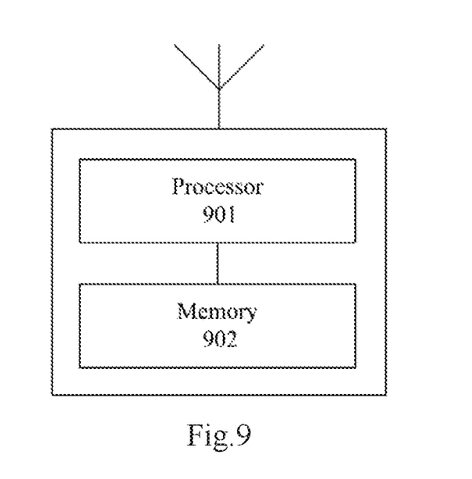
FIG. 9 is a schematic diagram of another user equipment according to some embodiments of the invention.

Based upon the same inventive idea as the method, some embodiments of the invention further provide a user equipment as illustrated in FIG. 9 including:

A processor 901 is configured to execute computer program for: transmitting a preamble over a set of sub-channels in a competition area, and monitoring a preamble over the set of sub-channels in the competition area; and transmitting data over a set of sub-channels in a data area corresponding to the set of sub-channels in the competition area if the resource competing module monitors no preamble over the set of sub-channels in the competition area, where different set of sub-channels in the competition area correspond to different set of sub-channels in the data area; and A memory 902 is configured to store codes of the computer program.

With the technical solution according to the embodiments of the invention, a preamble is transmitted over a set of sub-channels in the competition area to compete for resources in a corresponding set of sub-channels in the data area, and a preamble is monitored to thereby determine whether there is another D2D UE competing for the same sub-channel resources in the data area. If no preamble is monitored, which indicates that the resources in the corresponding set of sub-channels in the data area are occupied as a result of competition, then data will be transmitted over the resources. As can be apparent, the technical solution according to the embodiment of the invention can avoid in effect resource collision between the D2D UEs. Furthermore since fewer resources are occupied by the preamble, an overhead of resource competition can be lowered in effect by transmitting the preamble to compete for the sub-channel resources in the data area.

Those skilled in the art shall appreciate that the embodiments of the invention can be embodied as a method, a system or a computer program product. Therefore the invention can be embodied in the form of an all-hardware embodiment, an all-software embodiment or some embodiments of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A Device to Device (D2D) communication method, comprising:
    transmitting, by a User Equipment (UE), a first preamble over a set of sub-channels in a competition area, and monitoring, by the UE, whether a second preamble is transmitted by another UE over the set of sub-channels in the competition area; wherein the competition area comprises a plurality of transmission occasions, each of the transmission occasions is in "OFF" state or "ON" state: wherein the UE is able to transmit the first preamble on one of the transmission occasions in the "ON" state, and monitor the second preamble transmitted by the another UE on one of the transmission occasions in the "OFF" state: and transmitting, by the UE, data over a set of sub-channels in a data area corresponding to the set of sub-channels in the competition area when there is no second preamble transmitted by the another UE monitored over the set of sub-channels in the competition area, wherein a different set of sub-channels in the competition area corresponds to a different set of sub-channels in the data area.

2. The method according to claim 1, wherein before the data are transmitted over the set of sub-channels in the data area corresponding to the set of sub-channels in the competition area, the method further comprises:
   transmitting, by the UE, control information over all or a part of sub-channels in a set of sub-channels in a control area corresponding to the set of sub-channels in the competition area; and
   the transmitting, by the UE, the data over the set of sub-channels in the data area corresponding to the set of sub-channels in the competition area comprises:
   transmitting, by the UE, the data over the set of sub-channels in the data area corresponding to the set of sub-channels in the competition area as instructed by the control information.

3. The method according to claim 2, wherein the control information comprises a data transmission resource indicator and/or a modulation and coding scheme indicator.

4. The method according to claim 2, wherein transmitting the preamble over the set of sub-channels in the competition area, and monitoring the preamble transmitted by another D2D UE over the set of sub-channels in the competition area comprises:
   transmitting, by the UE, the first preamble on at least one of the transmission occasions in the "ON" state over the set of sub-channels in the competition area; and
   monitoring, by the UE, whether the second preamble is transmitted by the another UE on any one of the transmission occasions in the "OFF" state over the set of sub-channels in the competition area.

5. The method according to claim 1, wherein transmitting the preamble over the set of sub-channels in the competition area, and monitoring the preamble transmitted by the another UE over the set of sub-channels in the competition area comprises:
   transmitting, by the UE, the first preamble on at least one of the transmission occasions in the "ON" state over the set of sub-channels in the competition area; and
   monitoring, by the UE, whether the second preamble is transmitted by the another UE on any one of the transmission occasions in the "OFF" state over the set of sub-channels in the competition area.

6. The method according to claim 5, wherein when the second preamble transmitted by the another UE is monitored on the any one of the transmission occasions in the "OFF" state over the set of sub-channels in the competition area, stopping transmitting the first preamble, by the UE, on every subsequent transmission occasion of the transmission occasions in the "ON" state over the set of sub-channels in the competition area.

7. The method according to claim 6, wherein the each of the transmission occasions comprises a transmission component and a processing component, wherein the transmission component and the processing component of the each of the transmission occasion& operate in the Time Division Multiplex (TDM) mode;
   wherein the transmission component is a period used for transmitting the first preamble; and the processing component is a period used for detecting the second preamble transmitted by the another UE monitored, and performing a switch between transmitting and receiving.

8. A user equipment (UE), comprising at least one processor and a memory configured to store at least one computer program executed by the at least one processor:
   wherein the at least one computer program is executed by the at least one processor to transmit a first preamble over a set of sub-channels in a competition area, and monitor whether a second preamble is transmitted by another UE over the set of sub-channels in the competition area; wherein the competition area comprises a plurality of transmission occasions, each of the transmission occasions is in "OFF" state or "ON" state; wherein the UE is able to transmit the first preamble on one of the transmission occasions in the "ON" state, and monitor the second preamble transmitted by the another UE on one of the transmission occasions in the "OFF" state; and
   transmit data over a set of sub-channels in a data area corresponding to the set of sub-channels in the competition area when there is no second preamble transmitted by the another UE monitored over the set of sub-channels in the competition area, wherein a different set of sub-channels in the competition area corresponds to a different set of sub-channels in the data area.

9. The user equipment according to claim 8, wherein the at least one computer program is further executed by the at least one processor to:
   transmit control information over all or a part of sub-channels in a set of sub-channels in a control area corresponding to the set of sub-channels in the competition area; and
   transmit the data over the set of sub-channels in the data area corresponding to the set of sub-channels in the competition area as instructed by the control information.

10. The user equipment according to claim 9, wherein the control information comprises a data transmission resource indicator and/or a modulation and coding scheme indicator.

11. The user equipment according to claim 9, wherein the at least one computer program is further executed by the at least one processor to:
   transmit the first preamble on at least one of the transmission occasions in the "ON" state over the set of sub-channels in the competition area; and
   monitor whether the second preamble is transmitted by the another UE, on any one of the transmission occasions in the "OFF" state over the set of sub-channels in the competition area.

12. The user equipment according to claim 8, wherein the at least one computer program is further executed by the at least one processor to:
   transmit the first preamble on at least one of the transmission occasions in the "ON" state over the set of sub-channels in the competition area; and
   monitor whether the second preamble is transmitted by the another UE on any one of the transmission occasions in the "OFF" state over the set of sub-channels in the competition area.

13. The user equipment according to claim 12, wherein the at least one computer program is further executed by the at least one processor to:
   stop transmitting the first preamble on every subsequent transmission occasion of the transmission occasions in the "ON" state over the set of sub-channels in the competition area, when the second preamble transmitted by the another UE is monitored on the any one of the transmission occasions in the "OFF" state over the set of sub-channels in the competition area.

14. The user equipment according to claim 13, wherein the each of the transmission occasions comprises a transmission component and a processing component, wherein the transmission component and the processing component of the each of the transmission occasions operate in the Time Division Multiplex (TDM) mode; wherein the transmission component is a period used for transmitting the first preamble; and the processing component is a period used for detecting the second preamble transmitted by the another UE monitored, and performing a switch between transmitting and receiving.

* * * * *